US008227761B2

(12) United States Patent
Zhu et al.

(10) Patent No.: US 8,227,761 B2
(45) Date of Patent: Jul. 24, 2012

(54) TRUE COINCIDENCE SUMMING CORRECTION AND TOTAL EFFICIENCY COMPUTATION FOR RADIONUCLIDE SPECTROSCOPY ANALYSIS

(75) Inventors: Hongguo Zhu, Meriden, CT (US); Ramkumar Venkataraman, Middletown, CT (US); Wilhelm Mueller, Meriden, CT (US); Joseph Lamontagne, Cheshire, CT (US); Frazier Bronson, Branford, CT (US)

(73) Assignee: Canberra Industries, Inc., Meriden, CT (US)

( * ) Notice: Subject to any disclaimer, the term of this patent is extended or adjusted under 35 U.S.C. 154(b) by 312 days.

(21) Appl. No.: 12/561,949

(22) Filed: Sep. 17, 2009

(65) Prior Publication Data

US 2010/0072354 A1    Mar. 25, 2010

(51) Int. Cl.
*G01T 1/172* (2006.01)
(52) U.S. Cl. ........................................ 250/393
(58) Field of Classification Search ............... 250/393
See application file for complete search history.

(56) References Cited

U.S. PATENT DOCUMENTS 6,225,634 B1   5/2001   Atrashkevich et al.
6,228,664 B1   5/2001   Bronson et al.

OTHER PUBLICATIONS

Dirk Arnold, Octavian Sima, "Calculation of coincidence summing corrections for X-ray peaks and for sum peaks with X-ray contributions." Applied Radiation and Isotopes, vol. 64, issues 10-11 (Oct.-Nov. 2006) pp. 1297-1302.<doi:10.1016/j.apradiso.2006.02.051>.*
"Genie 2000 Alpha Analysis Software"; Feb. 2003; Canberra, Inc., 800 Research Parkway, Meriden, Connecticut, 06540; 2 pp.
Genie 2000 Basic Spectroscopy Software; Apr. 2006; Canberra, Inc., 800 Research Parkway, Meriden, Connecticut, 06540; 8 pp.
Genie 2000 Gamma Analysis Software; Aug. 2006; Canberra, Inc., 800 Research Parkway, Meriden, Connecticut, 06540; 4 pp.
Genie 2000 Interactive Peak Fit; Feb. 2003; Canberra, Inc., 800 Research Parkway, Meriden, Connecticut, 06540; 1.
"GammaVision-32 v6.07 Gamma-Ray Spectroscopy Software, Validated and Complaint with ANSI and ASME Standards"; (at least as early as Sep. 2008); Ortec, 801 South Illinois Ave., Oak Ridge, TN 37831-0895, USA; 20 pp.
Blaauw; "The Use of Sources Emitting Coincident y-Rays for Determination of Absolute Efficiency Curves of Highly Efficient Ge detectors"; 1993; Nuclear Instruments and Methods in Physics Research; A(332); 493-500.

(Continued)

*Primary Examiner* — Constantine Hannaher
(74) *Attorney, Agent, or Firm* — David W. Carstens; Carsten & Cahoon, LLP

(57) ABSTRACT

A method, system, and software for calculating the true coincidence summing effects for radionuclide spectroscopy analysis. A set of equations which can be implemented with a stored computer program performs calculations to correct the spectroscopic analysis data for gamma-gamma coincidence events, gamma-X-ray coincidence events, as well as gamma-annihilation photon coincidence events. The net gamma-ray, KX-ray and annihilation photon summing-out probabilities for the analytic gamma-ray is the total summing-out probability from all gamma-ray summing-out chains subtracted by the total summing-out probability from all gamma-ray sub-cascade chains involving the analytic gamma-ray. A total efficiency calculation is performed to eliminate the need for using radioactive sources to create summing specific calibration measurements and for increased accuracy.

12 Claims, 3 Drawing Sheets

OTHER PUBLICATIONS

Blaauw, et al.; Cascade Summing in Gamma-Ray Spectrometry in Marinelli-Beaker Geometries: The Third Efficiency Curve; 2003; Nuclear Instruments and Methods in Physics Research; 2003; A(505); 311-315.

Bronson, et al.; "Mathematial Calibration of Ge Detectors, and the Instruments That Use Them"; Jan. 1997; Canberra Industries, 800 Research Parkway, Meriden, CT 06450, USA; 12 pp.

De Corte; "The ko-Standardization Method: A Move to the Optimization fo Neutron Activation Anaysis"; 1986; Universiteit Gent, Rectorate, St. Pietersnieuwstraat 25, B—9000 Gent, Belgium; pp. 75-105 and 139-144.

Keyser, "The Evaluation of True Coincidence Summing Effect on CTBTO-type Sample Geometry"; at least as early as Jun. 2008; Ortec, 801 South Illinois Avenue, Oak Ridge, TN 37831, USA; 5 pp.

Kolotov, et al.; Testing of Different True Coincidence Correction Approaches for Gamma-Ray Spectrometry of Voluminous Sources; 1998; Journal of Radioanalytical and Nuclear Chemistry; vol. 233, Nos. 1-2, pp. 95-100.

Moens, et al.; Calculation of the Absolute Peak Efficiency of Ge and Ge(Li) Detectors for Different Counting Geometries; 1982; Journal of Radioanalytical Chemistry; vol. 70, No. 1-2; pp. 539-550.

Russ, et al.; Validation Testing of the Genie 2000 Cascade Summing Correction; 2005; Journal of Radioanalytical and Nuclear Chemistry; vol. 264, No. 1; pp. 193-197.

Sima, et al., "GESPECOR A Versatile Tool in Gamma-Ray Spectrometry"; Journal of Radioanalytical Nuclear Chemistry; vol. 248, No. 2; 2001; pp. 359-364.

* cited by examiner

TRUE COINCIDENCE SUMMING CORRECTION AND TOTAL EFFICIENCY COMPUTATION FOR RADIONUCLIDE SPECTROSCOPY ANALYSIS

CROSS-REFERENCE TO RELATED APPLICATIONS

This application claims the benefit of provisional Application No. 61/098,651, filed Sep. 19, 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to radionuclide spectroscopy analysis using radiation detectors, and, more specifically, to correcting the true coincidence summing and calculating total efficiency during spectroscopy analysis of radionuclides undergoing cascading gamma or X-ray emissions.

2. Description of Related Art Including Information Disclosed Under 37 CFR 1.97 and 1.98

Radioactive decay of a parent nuclide to the ground state of its daughter often results in the emission of several gamma ray photons in a cascade sequence. In some types of decay modes such as Electron Capture (EC) or transitions such as Internal Conversion (IC), X-rays are emitted in conjunction with the cascading gamma rays. During such an event if two photons with different energies are emitted in a cascade, and they are detected within the resolving time of the detector system, the two photons are said to be detected in true coincidence. The detector accumulates the sum total of the energy deposited by these two photons. If a photon deposits its full energy—and would normally be in the photo-peak—then any extra energy deposited from the second photon will remove the initial photon from the photo-peak. As a result, events are lost from the Full Energy Peak (FEP) of the gamma-ray of interest. Such a loss is known as a "summing-out". Conversely, partial energy depositions from two cascading photons could add up and result in an extra count in the Full Energy Peak (FEP) of a gamma ray of interest. Such a gain in counts is known as "summing-in". If either of these events occurs, then activity determination based on the normal measurement of the FEP efficiency will be in error, unless a correction is made.

Summing-in leads to an increase of an observable peak area, whereas summing-out leads to a decrease of an observable peak area. The total true coincidence summing effect (COI) with respect to a gamma line of interest (denoted with subscript "A") of a radionuclide under consideration is:

$$COI_A = (1 - L_A^{\gamma-\gamma} - L_A^{\gamma-X,511}) \cdot (1 + S_A^{\gamma-\gamma}) \cdot (1 + S_A^{\gamma-X,511}) \qquad \text{Math (1)}$$

where $L_A^{\gamma-\gamma}$ and $S_A^{\gamma-\gamma}$ are the loss and gain probability due to coincidence between decay gamma-rays, and $L_A^{\gamma-X,511}$ and $S_A^{\gamma-X,511}$ are the loss and gain probability due to coincidence between decay gamma-rays and X-rays, and 511 keV annihilation photon. These probabilities are the sum of the partial probabilities calculated for individual decay chains involving the gamma line of interest:

$$L_A = \sum_{i=1}^{N} L_{A,i}, \quad S_A = \sum_{j=1}^{M} S_{A,j} \qquad \text{Math (2)}$$

The computation of $L_A^{\gamma-\gamma}$ and $S_A^{\gamma-\gamma}$ is well known and described in U.S. Pat. No. 6,225,634; the present invention extends the concept to include coincidence corrections for X-rays and gamma-rays, and the 511 keV photons and gamma-rays, e.g. computation of $L_A^{\gamma-X,511}$.

It is therefore, necessary to correct the FEP efficiency for true coincidence effects. Various methods have been developed to deal with these "summing-in" and "summing-out" events. However, such methods fall far short of the novel invention disclosed herein.

To compute the summing-in and summing-out probability, L. Moens et al. [J. Radioanal. Nucl. Chem. 70 (1982) 539] suggested the use of gamma-ray intensities and derived the mathematical formulae for practically important cases for gamma-ray true coincidence summing correction. F. De Corte [The $k_0$-Standardization Method: A Move to the Optimization of Reactor Neutron Activation Analysis, Agrégé thesis, Rijksuniversitiet Gent, 1987] updated the approach by Moens, and extended it for the cases of gamma-KX (EC) and gamma-KX(IC) true coincidences, but only for a single decay chain.

V. Kolotov et al. [J. Radioanal. Nucl. Chem. 233 (1998) 95; U.S. Pat. No. 6,225,634] implemented Moen's approach in Canberra Industries, Inc.'s Genie-2000 spectroscopy analysis software product. The implementation is based on the mapping of the efficiencies in the space around the detector. In Kolotov's method, the total sample efficiency is computed by knowing the full energy peak efficiency and the intrinsic Peak-to-Total (P/T) ratio. The method assumes that the introduction of a sample does not affect the P/T ratio for voluminous sources. The true coincidence correction factor at a gamma ray of interest can be obtained by numerical integration of the correction factors for volume elements that are small enough for the efficiencies to be considered constant within them. Furthermore, the software code only corrects for true coincidence summing between decay gamma-rays and not between gamma and X-ray or 511 keV photons as in the present invention.

M. Blaauw [Nucl. Inst. Meth. Phys. Res., A332 (1993) 493] suggested a self-validating calibration method for simultaneous computation of the true coincidence effect and activity in the case of highly efficient point source. Together with S. Gelsema, Blaauw [Nucl. Inst. Meth. Phys. Res., A505 (2003) 311] introduced a third efficiency curve to account for the variation of the detector efficiency over the source volume due to self-attenuation and scattering in the sample. M. Blaauw and Gelsema's method is implemented in Ortec's GammaVision® spectroscopy analysis software product. However, the cascade summing correction results for radionuclides prone to gamma-X ray coincidences is marginal from the published data in the literature ["The evaluation of true coincidence effect on CTBTO-type sample geometry", The 2003 IEEE Nuclear Science Symposium and Medical Imaging Conference, Portland, Org., Oct. 19-25, 2003].

The GammaVision® product requires a geometry specific source based calibration that is both time consuming and expensive. Further, the performance of GammaVision® for radionuclides prone to gamma-X ray true coincidences summing is marginal, and there is no data available to verify the performance for gamma-511 keV true coincidence effects. Moreover, GammaVision® requires source-based calibrations for true coincidence summing correction, which can be both time consuming and very costly, and the cascade summing correction results are heavily dependent on the radionuclides in the calibration source and source geometry.

Kolotov's method uses a simple intrinsic P/T efficiency ratio calibration to estimate the total efficiency in a volume source. However, this can be used to correct for gamma-gamma true coincidence losses or gains, by utilizing P/T efficiency ratios that are maintained invariant throughout a voluminous source. This approach may introduce a higher uncertainty in the computed true coincidence correction factors. Using this method also requires the use of radioactive sources to determine the P/T efficiency calibration, which is then used to compute the total efficiency.

To date the true coincidence summing correction due to coincidence between gamma and X-rays or gamma and annihilation photons (or 511 keV) has not been adequately considered. Previous cascade summing correction inventions do not rigorously treat the gamma-KX ray and gamma-511 keV true coincidence summing analysis as does the present invention. Alternate methods can be employed using Monte Carlo codes such as MCNP-CP (Berlizov, A. N., MCNP-CP-A Correlated Particle Radiation Source Extension of a General Purpose Monte Carlo N-Particle Transport Code, Applied Modeling and Computations in Nuclear Science. Semkow, T. M., et al., Eds. ACS Symposium Series 945. American Chemical Society, Washington, D.C., 2006, p. 183-194.) and GEANT (Nuclear Instruments & Methods in Physics Research, A 506 (2003) 250-303.). MCNP-CP and GEANT may be used to compute true coincidence summing effects that involve gamma-X rays (and gamma-511 keV photons) true coincidence. However neither MCNP-CP nor GEANT are commonly available and both typically require exceedingly long computational times making such use impractical for other than academic settings.

Accordingly, a need exists for a method for efficiently computing the true coincidence summing correction factors between gamma-KX ray and gamma-511 keV events. Further, a need exists for a method of computing the voxelized total efficiency with gamma-ray buildup correction directly from a mathematical model to improve accuracy of the true coincidence correction factor for voluminous sources. The present invention satisfies these needs and others as demonstrated in the detailed description below.

BRIEF SUMMARY OF THE INVENTION

Disclosed is a method, system, and software for improving the accuracy of the full energy peak measurement during radionuclide spectroscopy analysis of a radiation source exhibiting any EC decay scheme, the analysis based on measurements obtained using a photon detection device, the method steps comprising: obtaining output data from at least one photon detection device; calculating, with a processing device, a gamma-gamma coincidence summing correction factor and an X-ray coincidence summing correction factor for multiple coincident gamma and X-ray detections; and applying the X-ray coincidence summing correction factor to the gamma-gamma coincidence summing correction factor to improve the accuracy of the full energy peak measurement of the radiation source.

This invention consists of a novel set of generalized formulae that have been derived for gamma-KX (EC) true coincidence summing correction, applicable to radionuclides undergoing decay in the EC mode. The invention has further derived a novel set of generalized formulae for gamma-annihilation photon true coincidence summing correction applicable to radionuclides undergoing radioactive decay via positron emission. The generalized formulae are applicable irrespective of how complicated the decay scheme of a given nuclide is. The novel method to compute the voxelized total efficiency with gamma-ray build-up correction directly from a mathematic model is more accurate for voluminous sources when compared to other existing methods to date. The true coincidence summing correction methodology based on these formulae and the computed total efficiency offers the first rigorous treatment developed and implemented with high degree of flexibility in defining source measurement geometries.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein.

Figure 1:
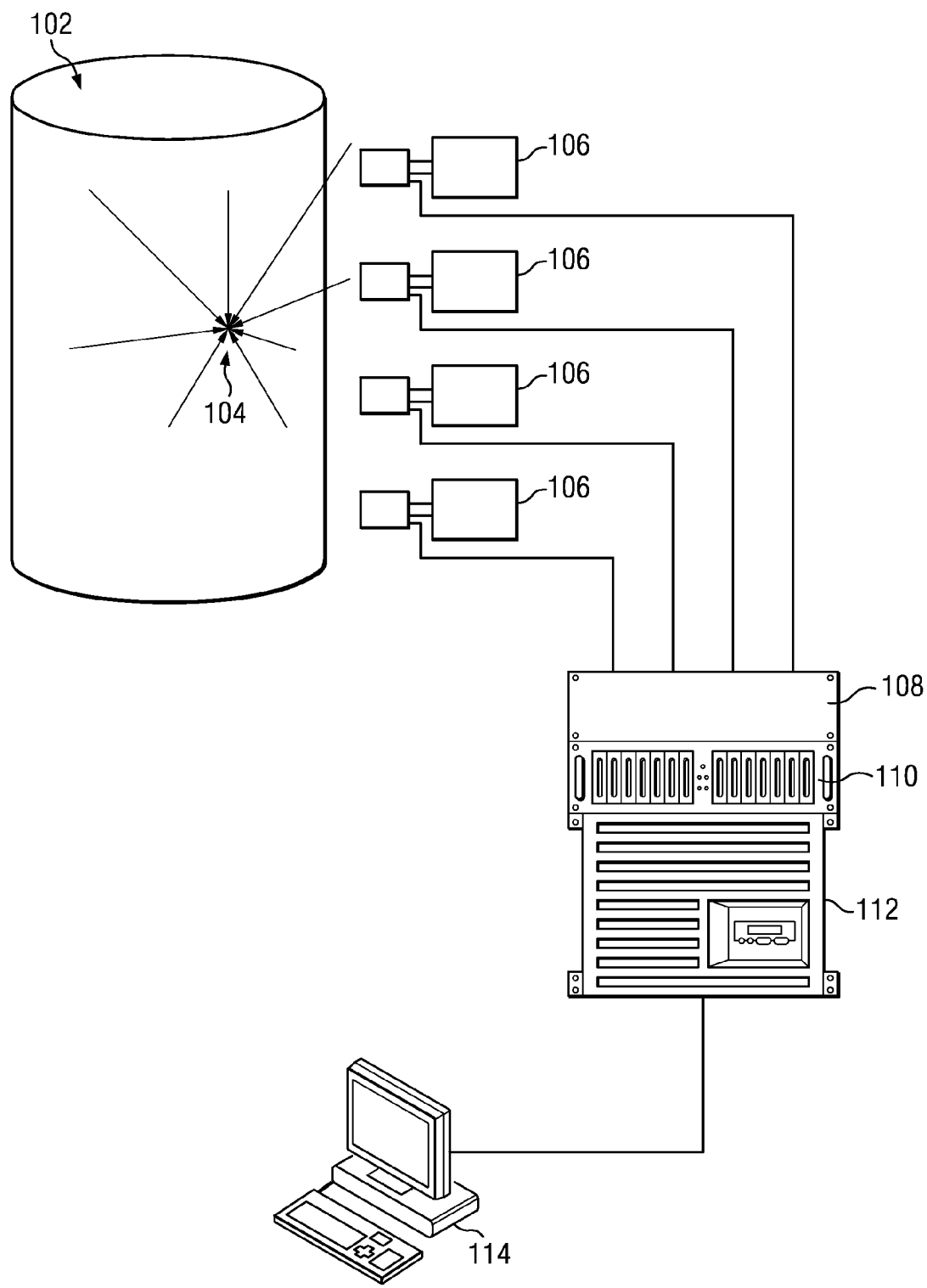
FIG. 1 is a depiction of an embodiment of a basic system as utilized by the present invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood (58,266).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

DETAILED DESCRIPTION OF THE INVENTION

The present invention builds upon patents currently owned by Canberra Industries, Inc. U.S. Pat. No. 6,225,634 to Atrashkevich, et al. and U.S. Pat. No. 6,228,664 to Bronson et al. are hereby incorporated by reference herein.

The present invention is operable to achieve true coincidence summing corrections and total efficiency calculations when analyzing gamma and X-ray or gamma and annihilation photon radiation events when performing spectroscopic analysis of a radioactive material. In a first embodiment activity measurements of a radioactive material are obtained using scintillation gamma detectors such as NaI(TI) and LaBr$_3$(Ce) scintillation detectors, Ge and HPGe detectors, Si(Li) detectors, and the like. The output of the detector is typically supplied to a multichannel analyzer where the detector signals are accumulated. The data obtained from the detectors is then supplied to a computing device wherein the novel algorithms disclosed herein are applied to achieve the stated goals.

As used herein, a computing device can be any computer processor capable of executing stored program instructions. This includes any general or special purpose computing platform such as, but not limited to, a desktop computer, a mainframe computer, a supercomputer, a device that incorporates one or more CISC or RISC processor devices, or the like. Other computing devices may include programmable array logic (PAL), generic array logic (GAL), complex programmable logic devices (CPLD), field programmable gate arrays (FPGA), or the like. Further, a computing device can include some combination of the aforementioned hardware.

As used herein, the term software or stored program includes, but is not limited to, any instructions used to program, perform calculations or perform operations using the aforementioned processing devices. For example, such program instructions are used to predefine the operation of a PAL, GAL, CPLD, or FPGA. Likewise, such program instructions may exist as machine code stored in a volatile or non-volatile storage medium accessible by the aforementioned CISC or RISC processor hardware. Such software or stored program also includes any combination of said program instructions.

FIG. 1 depicts and embodiment of the basic system hardware as may be utilized by the present invention. As shown, a radiation source (104) exists within the volume of a container (102). One or more photon detectors (106) are utilized to obtain radiation readings of the source (104). The output of the photon detectors is then fed to a multichannel analyzer (108) where the data is accumulated in system memory (110) for subsequent processing (112) and operator review (114). The processing device (112) operates on the data stored in the system memory (110) to perform spectroscopic analysis of the radiation source (104) using the novel algorithms described herein.

Figure 2:
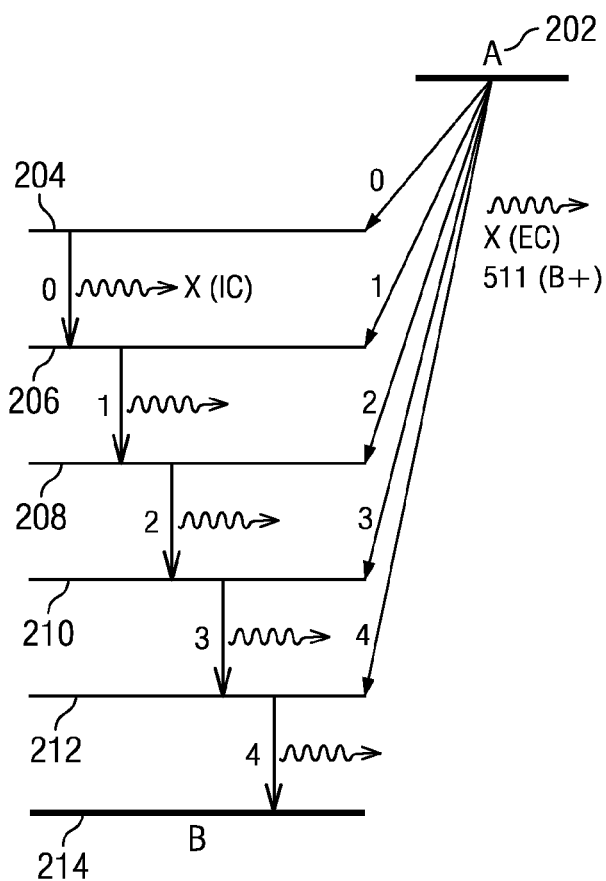
FIG. 2 is a depiction of a generic summing-out decay chain, with the cascading emissions as the parent radionuclide A decays to daughter nuclide B.

FIG. 2 depicts a generic decay chain wherein a parent nuclide decays to its daughter nuclide through Electron Capture decay or Positron decay. The sequence begins when a parent nuclide (202) transitions to the excited state of its daughter nuclide (214) through Electron Capture decay or Positron decay. The parent nuclide in this depiction undergoes five sequential transition events (204 through 214), releasing several gamma, X-ray and 511 keV annihilation photons along the way. Equations representing these decay chains follow.

Figure 3:
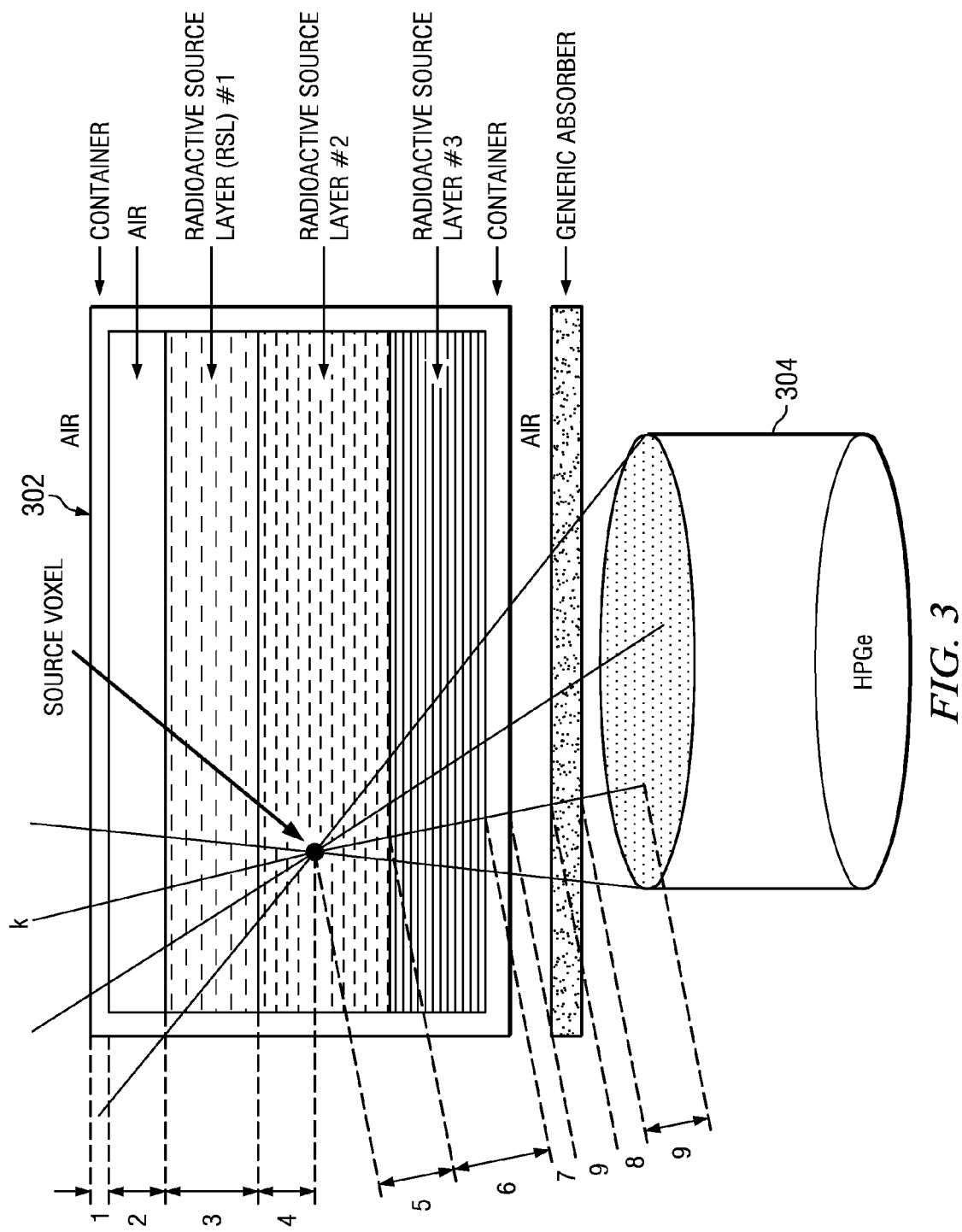
FIG. 3 is a general cross-section view of a sample matrix to be assayed by an HPGe detector.

FIG. 3 depicts a general cross-section view of a sample matrix (302) to be assayed by an HPGe detector (304) using the system and novel algorithms disclosed herein. In this example, the sample consists of three radioactive source layers (RSL #1 through #3), a sealed container (302), and air inside and outside of the container. An air gap also exists between the sample (302) and the detector (304). Considerations made by the algorithms include: (1) backscatter dimensions (effective radius and thickness) in the container, air, and radioactive source layers; (2) attenuator dimensions in the radioactive source layers and the container; (3) generic absorber dimensions; and (4) the air gap.

Referring again to the decay chain depicted in FIG. 2, the summing-out probability for the analytic gamma-ray in the summing-out chain depends on the position of the analytic gamma-ray. In a first embodiment, the summing-out probability formulae for each gamma-ray due to true coincidence between gamma-KX ray from electron capture (EC) derived by this invention are presented in Math (3) through Math (10).

Math 3 denotes the summing-out probability for the first cascading gamma-ray (206) due to coincidence with the X-rays:

Chain: 0 (A)→1→2→3→4, where A is the analytic gamma-ray:

$$\frac{\beta_0^{EC}}{T} P_{K,0} \omega_K \sum_i k_i \varepsilon_{t,k_i} \qquad \text{Math (3)}$$

where $k_j$ is the relative yield for KX-rays, $k\alpha_1$, $k\alpha_2$, $k_{\beta_1}$, $k_{\beta_2}$ . . . , etc, $\varepsilon_{t,i}$ and $\varepsilon_{t,kj}$ are the total efficiency for the analytical gamma-ray and associated KX-rays, and $\omega_k$ and $P_{k,0}$ . . . , and $\beta_0^{EC}$ is the EC decay branching ratio for the initial state of gamma-ray "0". T is the "normalization factor" due to the presence of multiple summing-out chains involving the gamma-ray of interest in the nuclide decay scheme. The calculation of T is performed over the summing-out chains and hence nuclide specific.

The summing-out probability for the second cascading gamma-ray (208) due to coincidence with the X-rays is computed as:

Chain: 0→1(A)→2→3→4, where A is the analytic gamma-ray:

$$B_0 P_{K,0} \omega_K \sum_i k_i \varepsilon_{t,k_i} - \qquad \text{Math (4)}$$

$$B_0 c_0 \Sigma_0 P_{K,0} \omega_K \sum_i k_i \varepsilon_{t,k_i} + B_1 P_{K,1} \omega_K \sum_i k_i \varepsilon_{t,k_i}$$

where $B_0 = \frac{\beta_0^{EC} a_0}{T}$ and $B_1 = \frac{\beta_1^{EC}}{T}$ are the probability that the analytic gamma-ray (gamma "1") is preceded by EC X-rays from the initial state of gamma-ray "0" and "1", $\beta_i^{EC}$ is the EC branching ratios for the initial state of gamma-ray "i", $a_i$ is the branching ratio for the i-th gamma-ray, $$c_i = \frac{1}{1+\alpha_i},$$

$\alpha_i$ is the internal conversion coefficient, and $\Sigma_i$ is the total efficiency including the i-th gamma-ray and associated internal conversion X-rays.

The summing-out probability for the third cascading gamma-ray (210) due to coincidence with the X-rays is computed as:

Chain: 0→1→2(A)→3→4, where A is the analytic gamma-ray:

$$B_0 P_{K,0} \omega_K \sum_i k_i \varepsilon_{k_i} - \qquad \text{Math (5)}$$
$$B_0 c_0 \Sigma_0 P_{K,0} \omega_K \sum_i k_i \varepsilon_{t,k_i} - B_0 c_1 \Sigma_1 P_{K,0} \omega_K \sum_i k_i \varepsilon_{t,k_i} +$$
$$B_0 c_0 c_1 \Sigma_0 \Sigma_1 P_{K,0} \omega_K \sum_i k_i \varepsilon_{t,k_i} + B_1 P_{K,1} \omega_K \sum_i k_i \varepsilon_{t,k_i} -$$
$$B_1 c_1 \Sigma_1 P_{K,1} \omega_K \sum_i k_i \varepsilon_{t,k_i} + B_2 P_{K,2} \omega_K \sum_i k_i \varepsilon_{t,k_i}$$

$$B_0 = \frac{\beta_0^{EC} a_0 a_1}{T} \qquad \text{Math (6)}$$
$$B_1 = \frac{\beta_1^{EC} a_1}{T}$$

where:

$$B_2 = \frac{\beta_2^{EC}}{T}$$

The summing-out probability for the fourth cascading gamma-ray (212) due to coincidence with the X-rays is computed as:

Chain: 0→1→2→3(A)→4, where A is the analytic gamma-ray:

$$B_0 P_{K,0} \omega_K \sum_i k_i \varepsilon_{t,k_i} - B_0 c_2 P_{K,0} \omega_K \sum_i k_i \varepsilon_{t,k_i} \Sigma_2 - \qquad \text{Math (7)}$$
$$B_0 c_1 P_{K,0} \omega_K \sum_i k_i \varepsilon_{t,k_i} \Sigma_1 - B_0 c_0 P_{K,0} \omega_K \sum_i k_i \varepsilon_{t,K_i} \Sigma_0 +$$
$$B_0 c_0 c_1 P_{K,0} \omega_K \sum_i k_i \varepsilon_{t,k_i} \Sigma_0 \Sigma_1 +$$
$$B_0 c_0 c_2 P_{K,0} \omega_K \sum_i k_i \varepsilon_{t,k_i} \Sigma_0 \Sigma_2 + B_0 c_1 c_2 P_{K,0} \omega_K \sum_i k_i \varepsilon_{t,k_i} \Sigma_1 \Sigma_2 -$$
$$B_0 c_0 c_1 c_2 P_{K,0} \omega_K \sum_i k_i \varepsilon_{t,k_i} \Sigma_0 \Sigma_1 \Sigma_2 + B_1 P_{K,1} \omega_K \sum_i k_i \varepsilon_{k_i} -$$
$$B_1 c_1 \Sigma_1 P_{K,1} \omega_K \sum_i k_i \varepsilon_{t,k_i} - B_1 c_2 \Sigma_2 P_{K,1} \omega_K \sum_i k_i \varepsilon_{t,k_i} +$$
$$B_1 c_1 c_2 \Sigma_1 \Sigma_2 P_{K,1} \omega_K \sum_i k_i \varepsilon_{t,k_i} + B_2 P_{K,2} \omega_K \sum_i k_i \varepsilon_{t,k_i} -$$
$$B_2 c_2 \Sigma_2 P_{K,2} \omega_K \sum_i k_i \varepsilon_{t,k_i} + B_3 P_{K,3} \omega_K \sum_i k_i \varepsilon_{t,k_i}$$

where: Math (8)

$$B_0 = \frac{\beta_0^{EC} a_0 a_1 a_2}{T}$$
$$B_1 = \frac{\beta_1^{EC} a_1 a_2}{T}$$
$$B_2 = \frac{\beta_2^{EC} a_2}{T}$$
$$B_3 = \frac{\beta_3^{EC}}{T}$$

The summing-out probability for the fifth cascading gamma-ray (214) due to coincidence with the X-rays is computed as:

Chain: 0→1→2→3→4(A), where A is the analytic gamma-ray:

$$B_1 P_{K,1} \omega_K \sum_i k_i \varepsilon_{t,k_i} - B_1 c_3 P_{K,1} \omega_K \sum_i k_i \varepsilon_{t,k_i} \Sigma_3 - \qquad \text{Math (9)}$$
$$B_1 c_2 P_{K,1} \omega_K \sum_i k_i \varepsilon_{t,k_i} \Sigma_2 - B_1 c_1 P_{K,1} \omega_K \sum_i k_i \varepsilon_{t,K_i} \Sigma_1 +$$
$$B_1 c_1 c_2 P_{K,1} \omega_K \sum_i k_i \varepsilon_{t,k_i} \Sigma_1 \Sigma_2 +$$
$$B_1 c_1 c_3 P_{K,1} \omega_K \sum_i k_i \varepsilon_{t,k_i} \Sigma_1 \Sigma_3 +$$
$$B_1 c_2 c_3 P_{K,1} \omega_K \sum_i k_i \varepsilon_{t,k_i} \Sigma_2 \Sigma_3 -$$
$$B_1 c_1 c_2 c_3 P_{K,1} \omega_K \sum_i k_i \varepsilon_{t,k_i} \Sigma_1 \Sigma_2 \Sigma_3 + B_2 P_{K,2} \omega_K \sum_i k_i \varepsilon_{k_i} -$$
$$B_2 c_2 \Sigma_2 P_{K,2} \omega_K \sum_i k_i \varepsilon_{t,k_i} - B_2 c_3 \Sigma_3 P_{K,2} \omega_K \sum_i k_i \varepsilon_{t,k_i} +$$
$$B_2 c_2 c_3 \Sigma_2 \Sigma_3 P_{K,2} \omega_K \sum_i k_i \varepsilon_{t,k_i} + B_3 P_{K,3} \omega_K \sum_i k_i \varepsilon_{t,k_i} -$$
$$B_3 c_3 \Sigma_3 P_{K,3} \omega_K \sum_i k_i \varepsilon_{t,k_i} + B_4 P_{K,4} \omega_K \sum_i k_i \varepsilon_{t,k_i}.$$

where: Math (10)

$$B_1 = \frac{\beta_1^{EC} a_1 a_2 a_3}{T}$$
$$B_2 = \frac{\beta_2^{EC} a_2 a_3}{T}$$
$$B_3 = \frac{\beta_3^{EC} a_3}{T}$$
$$B_4 = \frac{\beta_4^{EC}}{T}$$

The calculation is the same as for chain 0→1→2→3(A)→4, i.e. no 5th EC X-ray is considered and direct EC branch to gamma-ray "0" is ignored.

The total summing-out probability for the analytic gamma-ray due to EC KX-rays is the sum of the summing-out probability from each of its summing-out chains. The net KX-ray summing-out probability for the analytic gamma-ray is the total summing-out probability from all gamma-ray summing-out chains subtracted by the total summing-out probability from all gamma-ray sub-cascade chains involving the analytic gamma-ray.

Similarly, the coincidence summing-out probability for the analytic gamma-ray due to coincidence between gamma-511 keV annihilation photons is also given by Math (3) through Math (10) with the following substitution:

$$\beta_i^{EC} \Rightarrow \beta_i^{B+} \qquad \text{Math (11)}$$
$$P_{K,i} \omega_K \sum_j k_j \varepsilon_{t,k_j} \Rightarrow 2 \times \varepsilon_{t,511}$$

where $\varepsilon_{t,511}$ is the total efficiency of the 511 keV photon, and a factor of 2 is due to the presence of a pair of 511 keV photons.

Figure 4:
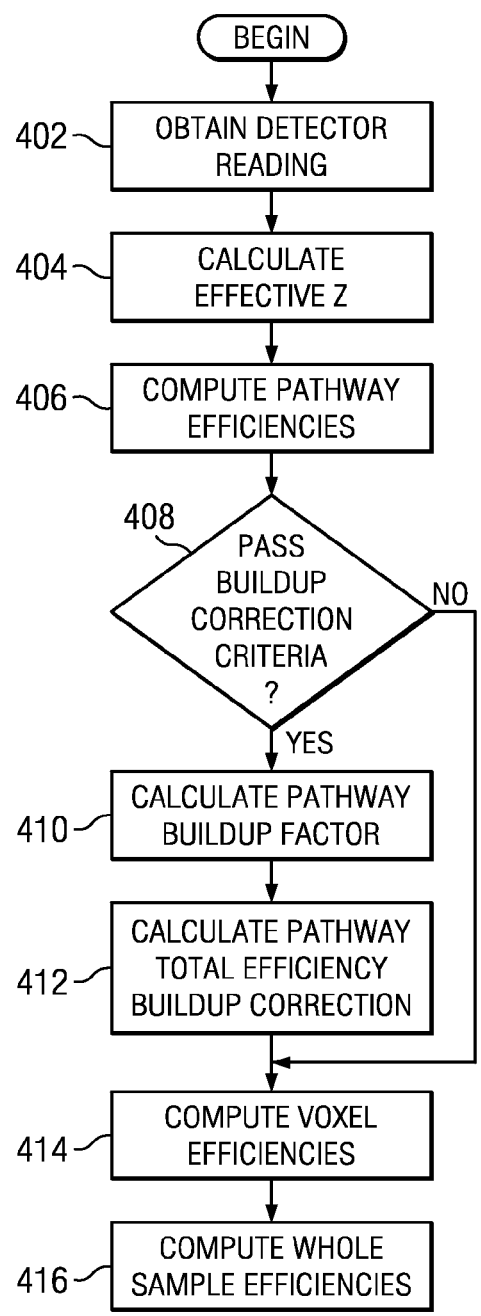
FIG. 4 is a flow chart depiction of the efficiency calculation and buildup correction steps of the present invention.

The method in the present invention computes the total sample efficiency for each volume element directly based on mathematical models (or ISOCS [F. L. Bronson and B. M. Young, Mathematical Calibrations of Ge Detectors and the Instruments that Use Them, Proc. 5th Annual NDA/NDE Waste Characterization Conference, Salt Lake City, Utah, Jan. 11, 1997]). No cascade summing specific calibration measurements are required. The total efficiency is corrected for material, geometry and photon energy specific, buildup effects in the attenuating and backscattering materials. The correction is performed for the total efficiency of each pathway of each volume element. It takes the following form:

$$\varepsilon_T^{pathway} = \varepsilon_{T,I}^{pathway} \cdot \frac{1}{CF_I} \cdot B_{at} \cdot B_{bk} \qquad \text{Math (1)}$$

where, $\varepsilon_{T,I}^{pathway} \equiv$ The $ISOCS$ pathway total
efficiency as currently calculated by $ISOCS$, $\frac{1}{CF_I} \equiv$ The intrinsic correction factor, $B_{at} \equiv$ The buildup correction due to absorbers
between the source voxel and the detector, $B_{bk} \equiv$ The buildup correction due to backscatters
behind the source voxel and the detector.

with:

$$\begin{aligned}
CF_I &= \begin{cases} \lambda \cdot e^{-\mu \cdot E}, & E \leq E_{cross} \text{ keV} \\ k, & E > E_{cross} \text{ keV} \end{cases} \\
B_{at} &= 1 + \alpha_{at} \cdot (1 - \beta_{at} \cdot e^{-\gamma_{at} \cdot R_{at}}) \cdot (B_{at}^{inf} - 1) \\
B_{at}^{inf} &= a_{at}(E) \cdot (\rho_{at} \cdot t_{at})^2 + b_{at}(E) \cdot (\rho_{at} \cdot t_{at}) + 1 \\
B_{bk} &= 1 + (1 - \alpha_{bk} \cdot e^{-\beta_{bk} \cdot R_{bk}}) \cdot (B_{bk}^{inf} - 1) \\
B_{bk}^{inf} &= 1 + a_{bk}(E) \cdot (1 - e^{-b_{bk}(E) \cdot \rho_{bk} \cdot t_{bk}}) \\
a_{bk}(E) &= e^{a_0 + a_1 \ln(E) + a_2 \ln^2(E) + a_3 \ln^3(E)} \\
b_{bk}(E) &= b_0 + b_1 \cdot e^{-b_2 \cdot E}
\end{aligned} \qquad \text{Math (2)}$$

where, $\lambda$, $\mu$, k, $\alpha_{at}$, $\beta_{at}$, $a_{at}$, $b_{at}$, $\lambda_{at}$, $\alpha_{bk}$, $\beta_{bk}$, $a_{bk}$, $b_{bk}$, $a_0$, $a_1$, $a_2$, $a_3$, $b_0$, $b_1$, $b_2$ are empirical fitting parameters; $E_{cross}$ is the cross-over energy; $R_{at}$ ($R_{bk}$) is the attenuator (backscatter) effective radius (i.e., ratio of attenuator effective diameter to the detector crystal diameter); $\rho_{at}$ ($\rho_{bk}$) and $t_{at}$ ($t_{bk}$) are the attenuator (backscatter) effective density and thickness/length; and E is the photon energy in [keV]. FIG. 4 depicts steps for calculating the total sample efficiency.

FIG. 4 depicts a flow diagram of the processing steps taken by the current embodiment in obtaining intrinsic efficiency calculations following the analysis above. To begin the use of these novel processing algorithms, detector readings are first obtained (402). Next, the mass-weighted effective atomic number (i.e., $Z_{eff}$) is determined for each material using Math (14):

$$Z_{eff}^j = \frac{\sum_{k=1}^{n} w_k^j \cdot Z_k^j}{\sum_{k=1}^{n} w_k^j} \qquad \text{Math (14)}$$

where $w_k^j$ is the mass fraction of the k-th element in the j-th material (consisting of n elements) and $Z_k^j$ is the atomic number of the k-th element in the j-th material.

Next, for a given voxel in a radioactive source layer (such as RSL #2 of FIG. 3), the peak and total efficiencies are calculated based on the cross section in the Mu-library for each material the photon traverses (406). Also considered is the attenuation length in each material (including all radioactive source layers and all other external absorbers). Once pathway efficiencies are determined and the buildup correction criteria are available (408), the pathway buildup factor is calculated for each pathway of the source voxel (410). This calculation utilizes the material density; the effective atomic number for each material (given by Math (3)); the pathway attenuation length in each material for the voxel; the backscatter thickness in each material for the voxel; the mass-weighted effective atomic number for all attenuators and for all backscatters; and the effective diameter of the attenuator and the backscatter.

Next, the buildup correction factor is applied toward the total gamma efficiency as a multiplicative factor for every pathway of the source voxel that is within the distance from the detector that is 2 to 3 times the detector diameter (412). With this data, the total gamma efficiency for each voxel is then calculated using the same weighted average method as used for the peak efficiency. The peak efficiency is then calculated for the sample as a whole by following the same calculation methods for the total efficiency (i.e., the total efficiencies of each radioactive source-voxel is volume averaged in the respective radioactive layer and the total efficiencies of each source layer are relative concentration weighted to derive the total gamma efficiency for the whole sample).

The present invention anticipates many configurations, some comprising the following preferred embodiments:

A method embodiment for improving the accuracy of the full energy peak measurement during radionuclide spectroscopy analysis of a radiation source exhibiting any EC decay scheme, the analysis based on measurements obtained using a photon detection device, the method steps comprising: obtaining output data from at least one photon detection device; calculating, with a processing device, a gamma-gamma coincidence summing correction factor and an X-ray coincidence summing connection factor for multiple coincident gamma and X-ray detections; and applying the X-ray coincidence summing correction factor to the gamma-gamma coincidence summing correction factor to improve the accuracy of the full energy peak measurement of the radiation source:

An embodiment wherein the method steps further comprise: calculating, with the processing device, an annihilation photon coincidence summing correction factor for coincidences between gamma and annihilation photon detections; and applying the annihilation photon coincidence summing correction factor to the gamma-gamma coincidence summing correction factor to improve the accuracy of the full energy peak measurement of the radiation source.

An embodiment wherein the method steps further comprise: applying the X-ray coincidence summing correction factor and annihilation photon coincidence summing correction factor simultaneously to the gamma-gamma coincidence summing correction factor to improve the accuracy of the full energy peak measurement of the radiation source.

An embodiment wherein the method steps further comprise: using a total gamma efficiency in the computation of the gamma-gamma, X-ray-gamma, and the annihilation photon-gamma coincidence summing correction factors.

A computer readable medium embodiment tangibly embodying machine-readable instructions executable by a computer processor to perform a method for improving the accuracy of the full energy peak measurement during radionuclide spectroscopy analysis of a radiation source exhibiting any EC decay scheme, the analysis based on measurements obtained using a photon detection device, the program steps comprising: obtaining output data from at least one photon detection device; calculating a gamma-gamma coincidence summing correction factor and an X-ray coincidence summing correction factor for multiple coincident gamma and X-ray detections; and applying the X-ray coincidence summing correction factor to the gamma-gamma coincidence summing correction factor to improve the accuracy of the full energy peak measurement of the radiation source.

A computer readable medium embodiment wherein the instructions further comprise: calculating an annihilation photon coincidence summing correction factor for coincidences between gamma and annihilation photon detections; and applying the annihilation photon coincidence summing correction factor to the gamma-gamma coincidence summing correction factor to improve the accuracy of the full energy peak measurement of the radiation source.

A computer readable medium embodiment wherein the instructions further comprise: applying the X-ray coincidence summing correction factor and annihilation photon coincidence summing correction factor simultaneously to the gamma-gamma coincidence summing correction factor to improve the accuracy of the full energy peak measurement of the radiation source.

A computer readable medium embodiment wherein the further comprise: using a total gamma efficiency in the computation of the gamma-gamma, X-ray-gamma, and the annihilation photon-gamma coincidence summing correction factors.

A system embodiment for improving the accuracy of the full energy peak measurement during radionuclide spectroscopy analysis of a radiation source exhibiting any EC decay scheme, the analysis based on measurements obtained using a photon detection device, the system comprising: a computer processing device capable of executing the program instructions comprising: obtaining output data from at least one photon detection device; calculating a gamma-gamma coincidence summing correction factor and an X-ray coincidence summing correction factor for multiple coincident gamma and X-ray detections; and applying the X-ray coincidence summing correction factor to the gamma-gamma coincidence summing correction factor to improve the accuracy of the full energy peak measurement of the radiation source.

A system embodiment wherein instructions further comprise: calculating an annihilation photon coincidence summing correction factor for coincidences between gamma and annihilation photon detections; and applying the annihilation photon coincidence summing correction factor to the gamma-gamma coincidence summing correction factor to improve the accuracy of the full energy peak measurement of the radiation source.

A system embodiment wherein the instructions further comprise: applying the X-ray coincidence summing correction factor and positron-annihilation photon coincidence summing correction factor simultaneously to the gamma-gamma coincidence summing correction factor to improve the accuracy of the full energy peak measurement of the radiation source.

A system embodiment wherein the instructions further comprise: using a total gamma efficiency in the computation of the gamma-gamma, X-ray-gamma, and the annihilation photon-gamma coincidence summing correction factors.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise. The present invention system/method claims description may employ "steps for computing" functional language that encompasses computations consistent with the correction algorithms disclosed herein and their equivalents which should be interpreted according to 35 U.S.C. 6.

We claim:

1. A spectroscopy analysis method comprising:
   obtaining output data from at least one photon detection device;
   step for calculating, with a processing device, a gamma-gamma coincidence summing correction factor and an X-ray coincidence summing correction factor for multiple coincident gamma and X-ray detections;
   applying the X-ray coincidence summing correction factor to the gamma-gamma coincidence summing correction factor to generate corrected full energy peak measurement data; and
   transforming the corrected full energy peak measurement data to a visual representation for presentation on a display device for operator review.

2. The spectroscopy analysis method of claim 1, further comprising:
   step for calculating, with the processing device, an annihilation photon coincidence summing correction factor for coincidences between gamma and annihilation photon detections; and
   applying the annihilation photon coincidence summing correction factor to the gamma-gamma coincidence summing correction factor to generate corrected full energy peak measurement data.

3. The spectroscopy analysis method of claim 2 further comprising:
   applying the X-ray coincidence summing correction factor and annihilation photon coincidence summing correction factor simultaneously to the gamma-gamma coincidence summing correction factor to generate corrected full energy peak measurement data.

4. The spectroscopy analysis method of claim 2 further comprising:
   using a total gamma efficiency in the computation of the gamma-gamma, X-ray-gamma, and the annihilation photon-gamma coincidence summing correction factors.

5. A computer readable medium tangibly embodying machine-readable instructions executable by a computer processor to perform a spectroscopy analysis method instructions comprising:
   obtaining output data from at least one photon detection device;
   step for calculating a gamma-gamma coincidence summing correction factor and an X-ray coincidence summing correction factor for multiple coincident gamma and X-ray detections;
   applying the X-ray coincidence summing correction factor to the gamma-gamma coincidence summing correction factor to generate corrected full energy peak measurement data; and
   transforming the corrected full energy peak measurement data to a visual representation for presentation on a display device for operator review.

6. The computer readable medium of claim 5, the instructions further comprising:

step for calculating an annihilation photon coincidence summing correction factor for coincidences between gamma and annihilation photon detections; and applying the annihilation photon coincidence summing correction factor to the gamma-gamma coincidence summing correction factor to generate corrected full energy peak measurement data.

7. The computer readable medium of claim 6, the instructions further comprising:

applying the X-ray coincidence summing correction factor and annihilation photon coincidence summing correction factor simultaneously to the gamma-gamma coincidence summing correction factor to generate corrected full energy peak measurement data.

8. The computer readable medium of claim 6, the instructions further comprising:

using a total gamma efficiency in the computation of the gamma-gamma, X-ray-gamma, and the annihilation photon-gamma coincidence summing correction factors.

9. A spectroscopy analysis system comprising:

a computer processing device configured to execute program instructions comprising:

obtaining output data from at least one photon detection device;

step for calculating a gamma-gamma coincidence summing correction factor and an X-ray coincidence summing correction factor for multiple coincident gamma and X-ray detections; and applying the X-ray coincidence summing correction factor to the gamma-gamma coincidence summing correction factor to generate corrected full energy peak measurement data; and transforming the corrected full energy peak measurement data to a visual representation for presentation on a display device for operator review.

10. The system of claim 9, the program instructions further comprising:

step for calculating an annihilation photon coincidence summing correction factor for coincidences between gamma and annihilation photon detections; and applying the annihilation photon coincidence summing correction factor to the gamma-gamma coincidence summing correction factor to generate corrected full energy peak measurement data.

11. The system of claim 10, the program instructions further comprising:

applying the X-ray coincidence summing correction factor and positron-annihilation photon coincidence summing correction factor simultaneously to the gamma-gamma coincidence summing correction factor to generate corrected full energy peak measurement data.

12. The system of claim 10, the program instructions further comprising:

using a total gamma efficiency in the computation of the gamma-gamma, X-ray gamma, and the annihilation photon-gamma coincidence summing correction factors.

* * * * *